(12) United States Patent
Cheon et al.

(10) Patent No.: US 8,209,754 B2
(45) Date of Patent: Jun. 26, 2012

(54) SECURE NFC APPARATUS AND METHOD SUPPORTING VARIOUS SECURITY MODULES IN PLUG-IN FASHION

(75) Inventors: Sung-Rock Cheon, Seoul (KR); Jae-Sic Jeon, Seoul (KR); O-Hyon Kwon, Seoul (KR); Joo-Sik Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 896 days.

(21) Appl. No.: 11/514,347

(22) Filed: Sep. 1, 2006

(65) Prior Publication Data

US 2007/0055633 A1 Mar. 8, 2007

(30) Foreign Application Priority Data

Sep. 8, 2005 (KR) .................. 10-2005-0083564

(51) Int. Cl.
*G06F 21/00* (2006.01)

(52) U.S. Cl. .............. 726/20; 726/9; 713/159; 713/172; 713/185

(58) Field of Classification Search .................. 705/65, 705/69; 713/159, 185, 172; 726/20, 9, 17, 726/16, 5; 380/270, 247, 249, 250, 287, 380/52; 379/433.09; 370/466, 467
See application file for complete search history.

(56) References Cited

U.S. PATENT DOCUMENTS

| | | | | |
|---|---|---|---|---|
| 6,045,043 A * | 4/2000 | Bashan et al. | ................. | 235/441 |
| 6,105,874 A * | 8/2000 | Berger et al. | ................. | 235/492 |
| 6,168,077 B1 * | 1/2001 | Gray et al. | ..................... | 235/375 |
| 6,577,229 B1 * | 6/2003 | Bonneau et al. | ........... | 340/10.41 |
| 6,725,061 B1 * | 4/2004 | Hutchison et al. | ............ | 455/557 |
| 6,776,339 B2 * | 8/2004 | Piikivi | .......................... | 235/451 |
| 6,839,772 B1 * | 1/2005 | Kowalski et al. | ................. | 710/5 |
| 6,944,402 B1 * | 9/2005 | Baker et al. | ..................... | 398/128 |
| 8,082,445 B2 * | 12/2011 | Cheon et al. | .................. | 713/172 |

(Continued)

FOREIGN PATENT DOCUMENTS

| | | |
|---|---|---|
| EP | 1168770 | 1/2002 |
| JP | 2006246343 A * | 9/2006 |
| WO | 2004/105359 | 12/2004 |

OTHER PUBLICATIONS

Walko, J., "A ticket to ride [Near field communications]," Communications Engineer, vol. 3, No. 1, pp. 11-14, Feb.-Mar. 2005 URL: http://ieeexplore.ieee.org/stamp/stamp.jsp?arnumber=1427620 &isnumber=30816.*

(Continued)

*Primary Examiner* — Eleni Shiferaw
*Assistant Examiner* — Hilary Branske
(74) *Attorney, Agent, or Firm* — Lowe Hauptman Ham & Berner, LLP

(57) ABSTRACT

A secure NFC apparatus includes a plug-in socket, an NFC unit, and a protocol matching unit. A security module is inserted in the plug-in socket. The NFC unit communicates with the outside via non-contact NFC using signals based on an S2C protocol. The protocol matching unit determines the type of chip in the inserted security module, generates a chip identification signal according to results of the identification, and matches the protocol of the signals based on the S2C protocol, which are input to and output from the NFC unit, with the protocol of the signals, which are input to and output from the security module, according to the chip identification signal.

26 Claims, 10 Drawing Sheets

U.S. PATENT DOCUMENTS

| | | | | |
|---|---|---|---|---|
| 2001/0044321 | A1* | 11/2001 | Ausems et al. | 455/556 |
| 2002/0177407 | A1* | 11/2002 | Mitsumoto | 455/41 |
| 2004/0035930 | A1* | 2/2004 | Arisawa et al. | 235/451 |
| 2004/0127256 | A1* | 7/2004 | Goldthwaite et al. | 455/558 |
| 2004/0235450 | A1* | 11/2004 | Rosenberg | 455/406 |
| 2005/0045720 | A1* | 3/2005 | Fruhauf | 235/440 |
| 2005/0064814 | A1* | 3/2005 | Matsuo et al. | 455/41.1 |
| 2005/0077356 | A1* | 4/2005 | Takayama et al. | 235/451 |
| 2005/0191968 | A1* | 9/2005 | Tabayashi et al. | 455/74 |
| 2006/0198364 | A1* | 9/2006 | Fujii | 370/352 |

OTHER PUBLICATIONS

Yoshida, Junko., "Chip makers still uncertain of plunge into NFC," Nov. 15, 2004, EE Times, URL: http://www.eetasia.com/ART_8800354026.HTM.*

JP 2006-246343, Fujii, Mar. 7, 2005, (Computer-generated English translation). [online]. [retrieved on Sep. 2, 2010]. Retrieved from: Patent Abstracts of Japan Database.*

Internet Archive Wayback Machine search results for URL: <http://www.semiconductors.philips.com/acrobat/other/identification/S2C_survey_10.pdf>, accessed Feb. 9, 2011.*

Seidler, "RFID Opportunities for mobile telecommunication services", ITU-T Lighthouse Technical Paper, International Telecommunication Union, May 2005.*

Phillips; $S_2C$ Interface for NFC; "Adding a general purpse interface between NFC and Secure IC to Secure NFC"; Jan. 21, 2005; Survey V1.0; 12 pages.

ECMA; Standard ECMA-352; Near Field Communication Interface and Protocol—2 (NFCIP-2); Dec. 2003; $1^{st}$ Edition; 8 pages.

European Search Report for European App. 06254607.2.

Phillips Corp.; "$S_2C$ Interface for NFC"; "Adding a general purpose interface between NFC and Secure IC to Secure NFC"; Jan. 12, 2005; Survey V1.0; 12 pages.

Phillips; "S2c Interface for NFC"; Adding a general purpose interface between NFC and Secure IC to Secure NFC; Jan. 21, 2005; Survey V1.0; 12 pages.

* cited by examiner

SECURE NFC APPARATUS AND METHOD SUPPORTING VARIOUS SECURITY MODULES IN PLUG-IN FASHION

BACKGROUND OF THE INVENTION

1. Field of the Invention

The present invention relates generally to Near Field Communication (NFC)- and, more particularly, to an NFC apparatus and method that are capable of supporting security modules based on a SigIn-SigOut-Connection (S2C) interface or general security modules, such as contact/non-contact smart cards, in a plug-in fashion.

2. Related Art

FIG. 1 is a block diagram showing the construction of a conventional secure NFC apparatus 100. Referring to FIG. 1, the secure NFC apparatus 100 includes an NFC unit 110 and the security module 120.

The NFC unit 110 may be controlled by the host processor of a mobile communication terminal or the like, and it communicates with the security module 120 via signals SigIn and SigOut based on the S2C interface. The security module 120 is a kind of Subscriber Identity Module (SIM), and may store authentication information for user identification. The S2C interface was developed by Philips Electronics for the purpose of communication between the NFC unit 110 and the security module 120.

The secure NFC apparatus 100 may be mounted in a portable terminal such as a mobile communication terminal. The secure NFC apparatus 100 may perform the function of a traffic card or a smart card.

For example, a user who attempts to pass through a security gate brings a portable terminal equipped with the secure NFC apparatus 100 close to a main body that is installed at the security gate for entry authentication, and authentication information is transmitted to the main body through the antenna 111 of the secure NFC apparatus 100 to be used for entry authentication. If the authentication is successful, the user can pass through the security gate.

Furthermore, a user brings the portable terminal equipped with the secure NFC apparatus 100 close to a reader for authenticating the amount of charged money, and the user can be allowed to use transportation and pay for shopping depending on whether the authentication by the reader is successful.

However, the prior art secure NFC apparatus 100 supports only the security module 120 that communicates with the NFC unit 110 based on the S2C interface. Therefore, in the case where other security authentication modules, such as a contact smart card core chip based on the International Standards Organization (ISO) 7816 protocol or a non-contact smart card core chip based on the ISO 14443 protocol, are used as the security module 120, the interface specifications of the security authentication modules are not compatible with those of the NFC unit 110. Accordingly, data associated with the modules used (for example, authentication information) is not compatible, so there is a problem in that the management of data is inconvenient.

Furthermore, there has been an attempt to make the NFC unit 110 receive data, such as authentication information, from the outside and the security module 120 manage the data. However, the scheme related to this attempt was not satisfactory. Furthermore, the scheme encountered difficulty in that it is difficult to manage personal information, such as electronic name cards, managed in a mobile communication terminal because the scheme does not support peer-to-peer data transmission and reception between mobile communication terminals.

SUMMARY OF THE INVENTION

Accordingly, the present invention has been made keeping in mind the above problems occurring in the prior art, and an object of the present invention is to provide a secure NFC apparatus, which performs protocol conversion on security authentication modules that do not follow the S2C protocol so that security authentication modules, which follow not only the S2C protocol of NFC but also an ISO protocol, such as general contact/non-contact smart cards, can be inserted into a socket in a plug-in fashion and can be compatible in NFC.

Another object of the present invention is to provide a secure NFC method of, in order to support security authentication modules inserted into a socket in a plug-in fashion, identifying the types of the security authentication modules and performing protocol conversion on security authentication modules that do not follow the S2C protocol according to the results of the identification.

In order to accomplish the objects, according to an embodiment of the present invention, there is provided a secure NFC apparatus, including a plug-in socket for inserting a security module; an NFC unit for communicating with an outside via non-contact NFC using signals based on an S2C protocol; and a protocol matching unit for identifying a type of chip in the inserted security module, generating a chip identification signal according to the results of the identification, and matching a protocol of the signals based on the S2C protocol, which are input to and output from the NFC unit, with a protocol of signals, which are input to and output from the security module, according to the chip identification signal.

The protocol matching unit may include a chip identification unit for transmitting a request signal to the security module and generating the chip identification signal according to a signal received in response to the request signal; a selection unit for selectively bypassing the signals based on an S2C protocol, which are input to and output from the NFC unit to the security module, or outputting the signals based on the S2C protocol as signals for protocol conversion, depending on the chip identification signal; and a protocol conversion unit for performing protocol conversion between the signals based on the S2C protocol which are output from the selection unit, and the signals which are input to and output from the security module, so that the signals are compatible with each other.

In order to accomplish the objects, according to an embodiment of the present invention, there is provided a secure NFC method using a security module inserted into a socket in a plug-in fashion, the method including the steps of communicating with an outside via NFC using signals based on an S2C protocol; identifying a type of chip in the security module and generating a chip identification signal according to results of the identification; and matching a protocol of the signals based on the S2C protocol to a protocol of the signals input to and output from the security module according to the chip identification signal.

The secure NFC method may further include the steps of determining whether the security module is a module having a chip based on an S2C protocol; bypassing the signals based on an S2C protocol and outputting the signals to the security module if the security module is a module having a chip based on an S2C protocol; determining whether the security module is a module having a chip based on an ISO protocol; and performing protocol conversion between the signals based on an S2C protocol and the signals input to and output from the security module if the security module is a module having a chip based on an ISO protocol.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
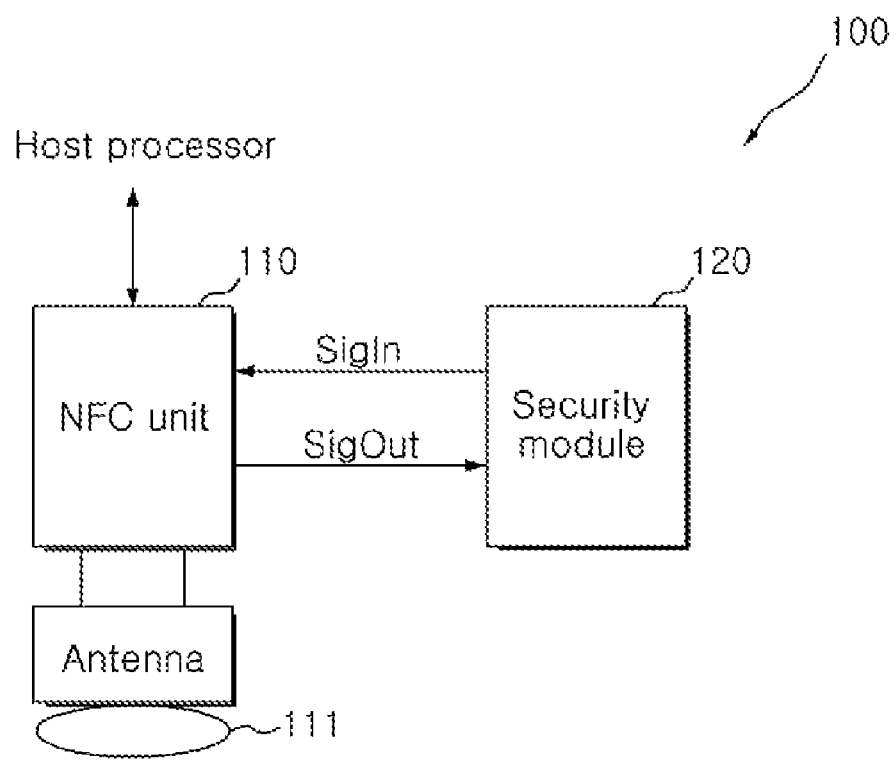
FIG. 1 is a block diagram showing the construction of a conventional secure NFC apparatus.

Reference should now be made to the drawings, in which the same reference numerals are used throughout the different drawings to designate the same or similar components.

Figure 2:
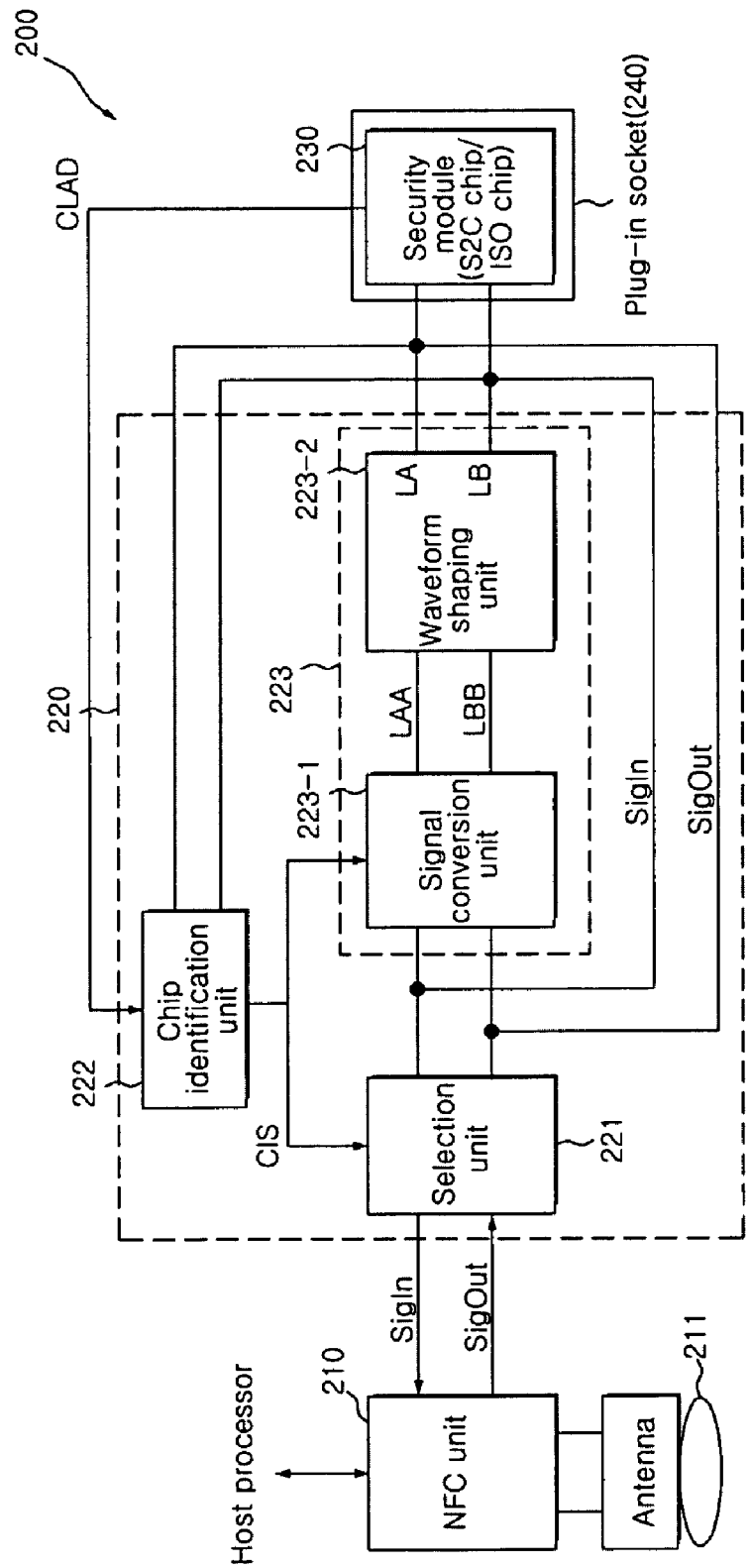
FIG. 2 is a block diagram showing the construction of a secure NFC apparatus according to an embodiment of the present invention.

FIG. 2 is a block diagram showing the construction of a secure NFC apparatus 200 according to an embodiment of the present invention. Referring to FIG. 2, the NFC apparatus 200 includes an NFC unit 210, a protocol matching unit 220, a security module 230, and a plug-in socket 240 into which the security module 230 is inserted.

Figure 9:
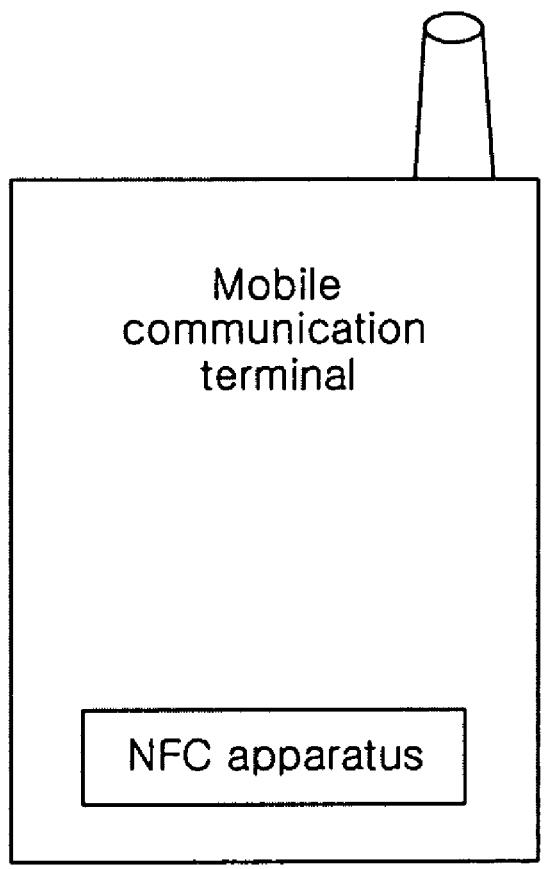
FIG. 9 is a diagram showing the relationship of a communication application between a mobile communication terminal equipped with the secure NFC apparatus and a reader, according to an embodiment of a present invention.
Figure 9:
Figure 9:
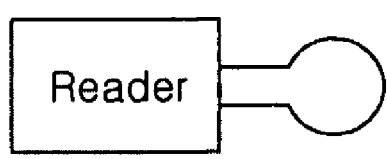
Figure 10:
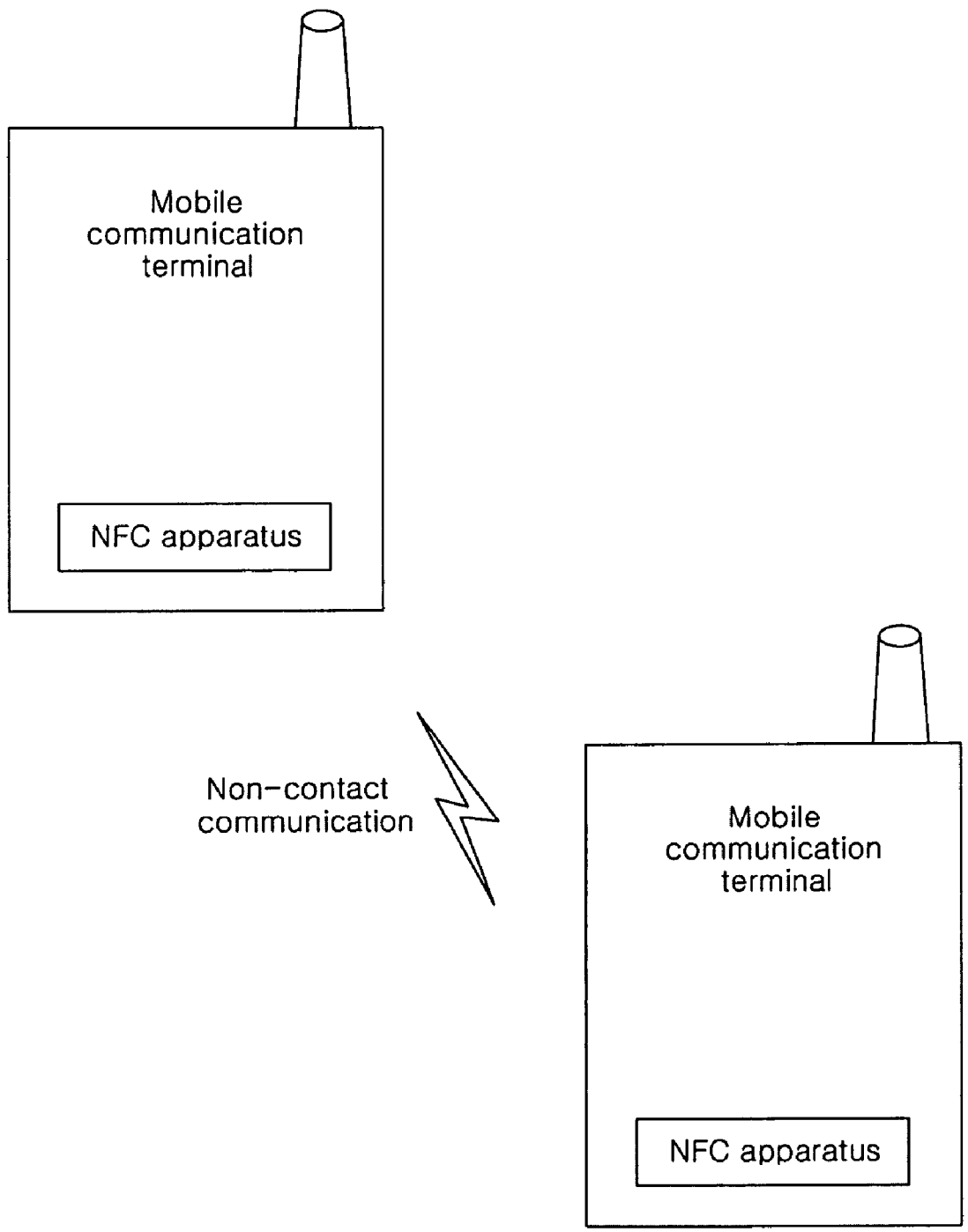
FIG. 10 is a diagram showing the relationship of a communication application between mobile communication terminals each equipped with the secure NFC apparatus, according to an embodiment of a present invention.

The secure NFC apparatus 200 may be mounted in a portable terminal, such as a mobile communication terminal. The secure NFC apparatus 200, as shown in FIG. 9, may perform the function of a traffic card or a smart card via communication with a reader. Furthermore, the present invention is proposed such that peers, that is, mobile communication terminals, equipped with secure NFC apparatuses 200 can exchange personal information with each other, as shown in FIG. 10.

In particular, unlike the fact that a conventional secure NFC processor supports only communication with a specific security authentication module communicating based on the S2C interface, in the present invention, the protocol matching unit 220 performs protocol conversion on security authentication modules that do not follow the S2C protocol when security modules 230, such as modules that have security authentication chips and follow not only the S2C protocol of NFC but also the ISO protocols of contact smart cards based on the general ISO 7816 protocol or a non-contact smart cards based on the ISO 14443 protocol, are inserted into the socket 240 in a plug-in fashion and are compatible in NFC.

The NFC unit 210 is an NFC processor that performs non-contact NFC interfacing with an external reader or the NFC apparatus of a peer terminal using first and second base-band signals SigIn and SigOut based on the S2C protocol. The NFC unit 210 can operate under the control of the host processor of a mobile communication terminal equipped with the secure NFC apparatus 200.

The NFC unit 210 receives the first base-band signal SigIn based on the S2C protocol from the protocol matching unit 220, and processes the first base-band signal SigIn into information in Radio Frequency (RF) form, which corresponds to the first signal SigIn. The NFC unit 210 transmits the generated information to a reader or a peer terminal via non-contact NFC through an antenna 211.

The NFC unit 210 may receive RF information from the reader or the peer terminal via NFC through the antenna 211. The NFC unit 210 may process the received RF information, generate the second base-band signal SigOut based on the S2C protocol, and transmit the generated second signal SigOut to the protocol matching unit 220.

The protocol matching unit 220 matches the protocols of the signals, which are input and output between the NFC unit 210 and the security module 230, with each other according to a chip identification signal CIS indicating the chip type of the security module 230. For example, in the case where the chip of the security module 230 is identified as a chip using the S2C protocol based on the chip identification signal CIS, the protocol matching unit 220 connects the two Input/Output (I/O) terminals of the NFC unit 210 with the two I/O terminals of the security module 230, thereby bypassing the signals SigIn and SigOut based on the S2C protocol, which are respectively input to and output from the NFC unit 210 to the security module 230, and bypassing the signals which are respectively input to and output from the security module 230 to the NFC unit 210. Furthermore, in the case where the chip of the security module 230 is identified as the security authentication chip of a non-contact smart card based on the ISO 14443 protocol according to the chip identification signal CIS, the protocol matching unit 220 converts the signals SigIn and SigOut based on the S2C protocol, which are input to and output from the NFC unit 210, into signals LA-LB based on the ISO protocol, which are input to and output from the security module 230, and converts the signals LA-LB based on the ISO protocol, which are input to and output from the security module 230, into the signals SigIn and SigOut based on the S2C protocol, which are input to and output from the NFC unit 210, between the NFC unit 210 and the security module 230. The generation of the chip identification signal CIS will be described in detail below.

Figure 3:
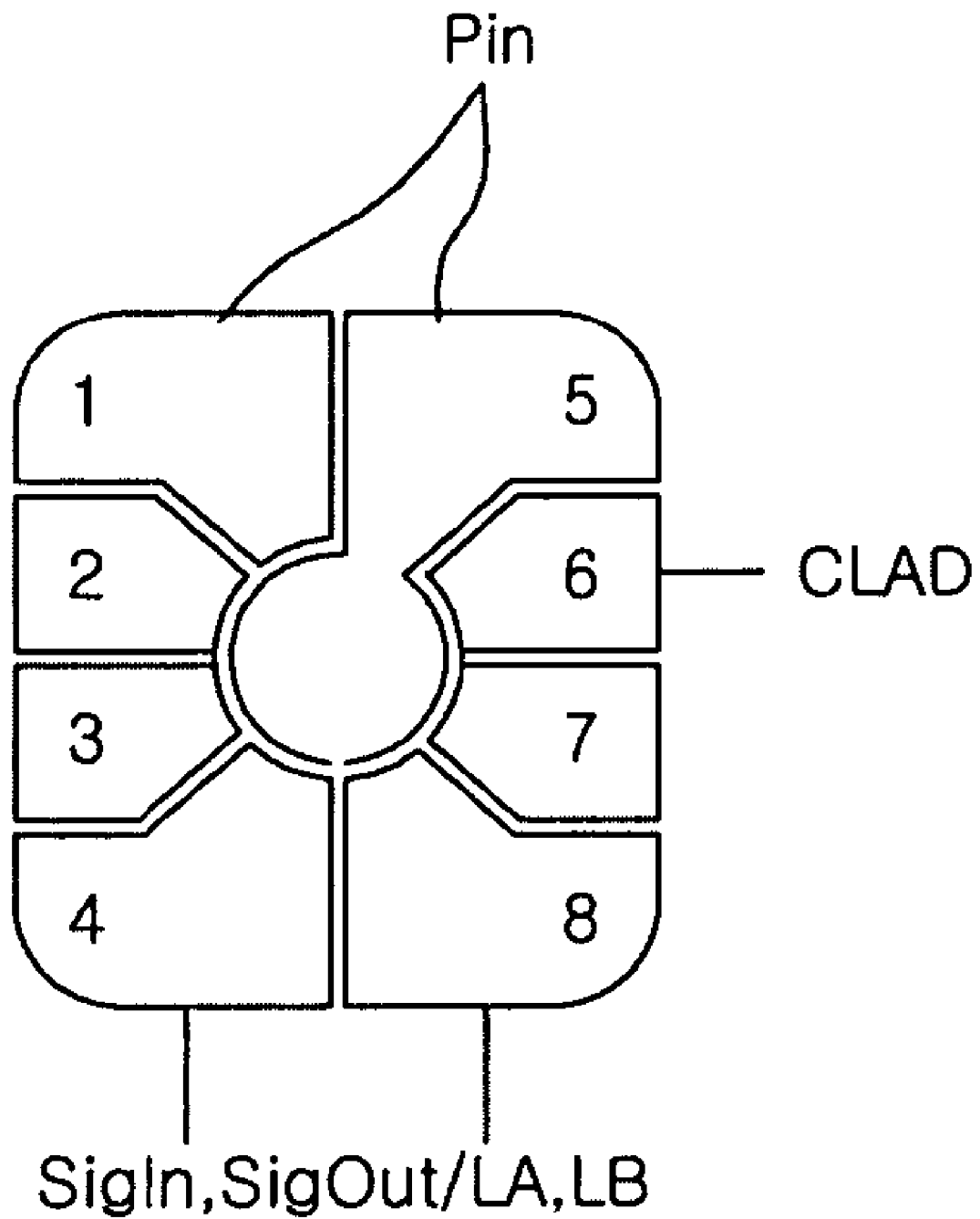
FIG. 3 is a view showing the appearance of the chip of a security module inserted into a plug-in socket.

The security module 230 is inserted into the socket 240 in a plug-in fashion, and may be a module having one of various authentication chips, such as a security authentication chip following the S2C protocol of NFC, the core chip of a contact smart card following the general ISO 7816 protocol or the core chip of a non-contact smart card following the ISO 14443 protocol. In particular, in the case where the security module 230 has the core chip of the non-contact smart card following the ISO 14443 protocol, the security module 230 operates in response to the signals LA-LB input to and output from the chip and can output authentication information stored therein to terminals LA-LB. The appearance of the chip in the security module 230 inserted into the plug-in socket 240 may follow that of a module having the core chip of a contact smart card following the ISO 7816 protocol, as shown in FIG. 3. In this case, the security module 230 may have eight external pins connected to the internal circuit of the chip. Accordingly, a plug-in socket corresponding to the chip specifications of the contact smart card based on the ISO 7816 protocol is used as the socket 240 into which the security module 230 is inserted.

In general, in the core chip of the contact smart card based on the ISO 7816 protocol, pins Nos. 1, 2, 3, 5, and 7 are used, while in the present invention, pins Nos. 4 and 8 may be used as the I/O signal (SigIn and SigOut) pins of the security authentication chip following the S2C protocol of NFC, which may be inserted as the security module 230, or the I/O signal (LA-LB) pins of the core chip of the non-contact smart card following the general ISO 14443 protocol. Furthermore, pin No. 6 may be used as a Contactless Appearance Detection (CLAD) signal pin that is used to detect whether a chip is a non-contact chip.

Figure 4:
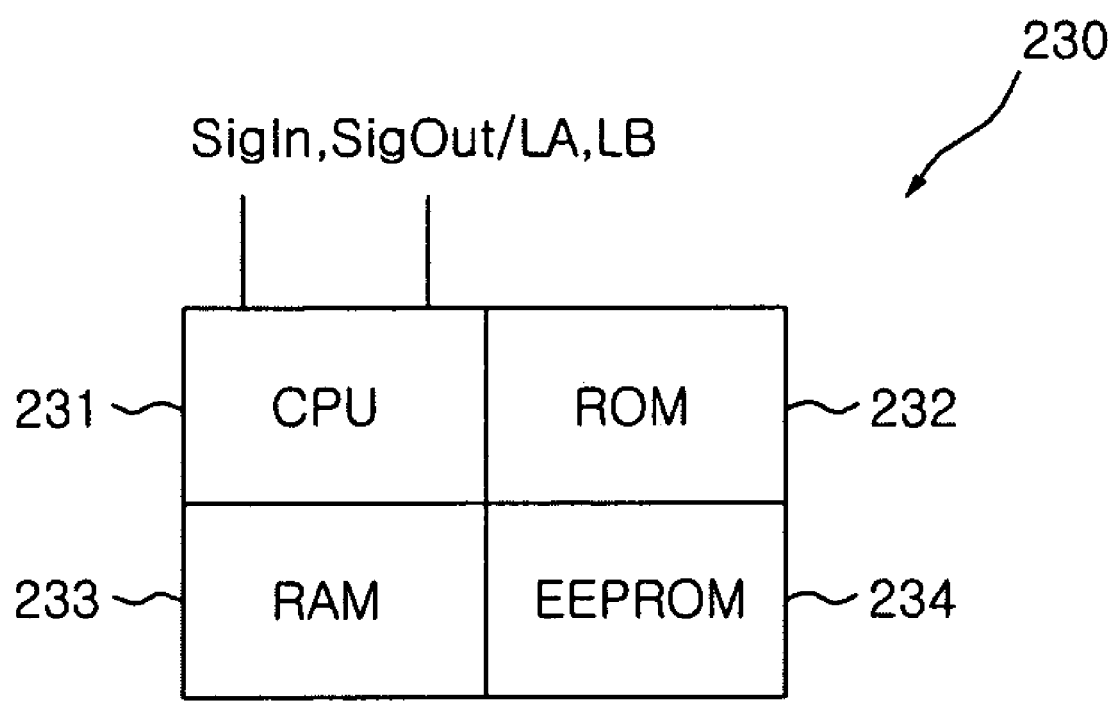
FIG. 4 is a diagram showing an example of the detailed construction of the security module of FIG. 2.

FIG. 4 is a diagram showing an example of the detailed construction of the security module 230 of FIG. 2. Referring to FIG. 4, the security module 230 may include a Central Processing Unit (CPU) 231, Read-Only Memory (ROM) 232, Random Access Memory (RAM) 233, and Electrically Erasable Programmable ROM (EEPROM 234). The CPU 231 is responsible for the overall control of the security module 230. The ROM 232 stores an overall system program for the operation of the security module 230. The RAM 233 stores temporary data necessary at the time of operation of internal data. The EEPROM 234 stores authentication information for transmission and reception in conjunction with an external card reader or other terminals.

In FIG. 2, the protocol matching unit 220 includes a selection unit 221, a chip identification unit 222, and a protocol conversion unit 223.

The chip identification unit 222 transmits a request signal to the security module 230, and generates a chip identification signal CIS in response to a signal received in response to the request signal. In the case where the security module 230 is identified as a module having a chip based on the S2C protocol according to the chip identification signal CIS, the selection unit 221 bypasses the signals SigIn and SigOut based on the S2C protocol, which are input to and output from the NFC unit 210, to the security module 230. In the case where the security module 230 is identified as a module having a chip based on the ISO protocol according to the chip identification signal CIS, the selection unit 221 outputs the signals SigIn and SigOut based on the S2C protocol, which are input to and output from the NFC unit 210, to the protocol conversion unit 223 as signals for protocol conversion. Accordingly, in the case where the security module 230 is identified as a module having a chip based on the ISO protocol according to the chip identification signal CIS, the protocol conversion unit 223 performs protocol conversion such that the signals SigIn and SigOut based on the S2C protocol for the protocol conversion, which are output from the selection unit 221, are compatible with the signals LA-LB input to and output from the security module 230.

Figure 5:
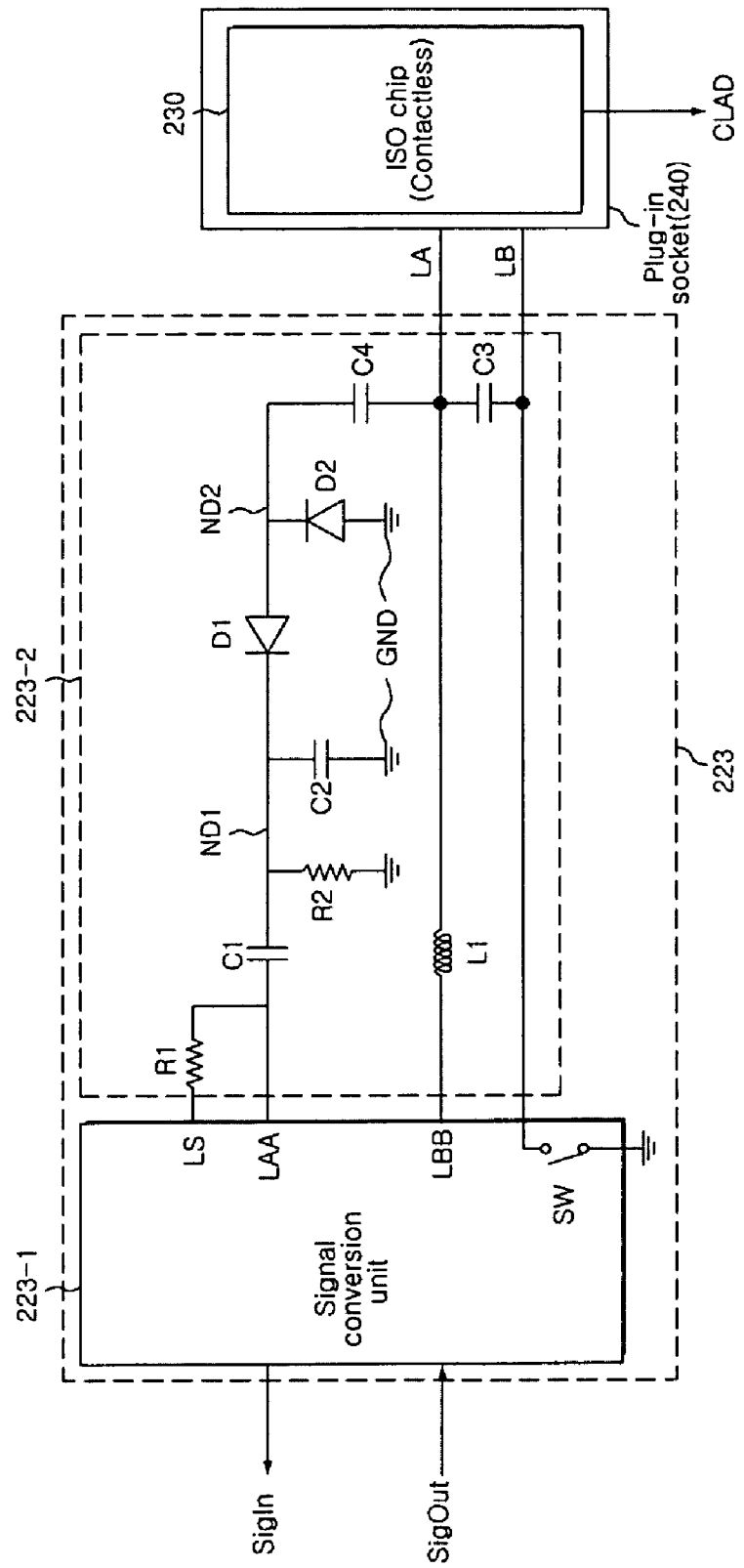
FIG. 5 is a detailed block diagram showing the relationship between the protocol conversion unit and ISO chip of FIG. 2.

A detailed block diagram showing the relationship between the protocol conversion unit 223 of FIG. 2 and a chip based on the ISO protocol, which is inserted into the security module 230, when the protocol conversion unit 223 performs the protocol conversion is shown in FIG. 5. Referring to FIG. 5, the protocol conversion unit 223 includes a signal conversion unit 223-1 and a waveform shaping unit 223-2.

The signal conversion unit 223-1 performs protocol conversion such that Miller coded signals based on the S2C protocol are compatible with Manchester coded signals based on the ISO protocol.

Figure 6:
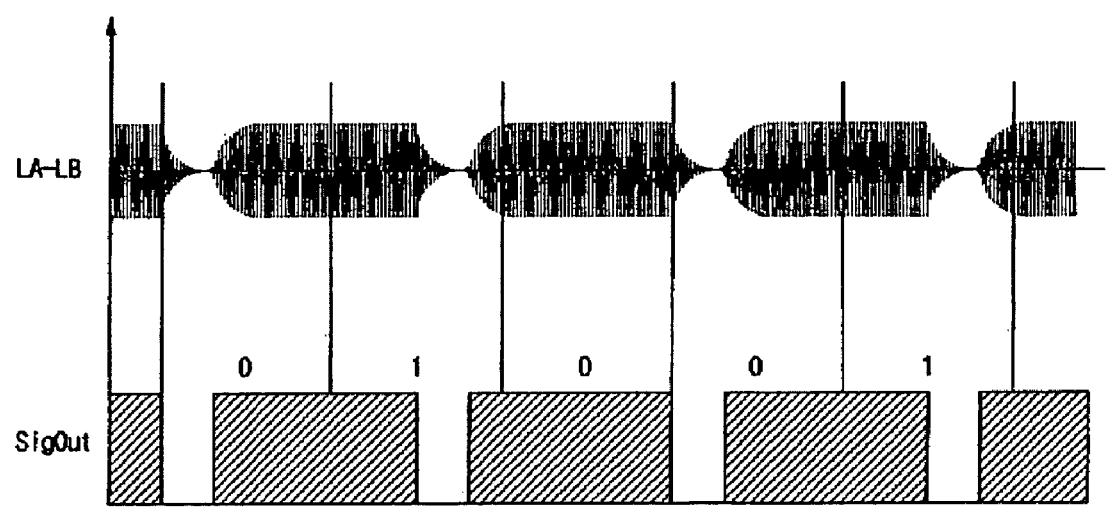
FIG. 6 is a waveform diagram of a process in which a signal based on the S2C protocol received from an NFC unit is converted into a signal based on the ISO protocol and is then output to the security module.

For example, the signal SigOut based on the S2C protocol, which is received from the NFC unit 210, is a digital signal coded using Miller coding, as shown in the lower view of FIG. 6. An analog signal LAA-LBB, which is generated by the signal conversion unit 223-1 and output to the waveform shaping unit 223-2, is a signal that is modulated and coded using Manchester coding, as shown in the upper view of FIG. 6. As shown in FIG. 6, the signal conversion unit 223-1 converts the signal SigOut coded using Miller coding into an analog signal having a constant frequency peak-to-peak level according to the logic states of the Miller coded signal SigOut. In other words, the signal conversion unit 223-1 converts a digital signal having a high logic state into an analog signal having a high peak-to-peak level, and converts a digital signal having a low logic state into an analog signal having a low peak-to-peak level. The digital code based on Miller coding is based on a coding scheme in which a signal having a low logic state at the initial part of a constant period is considered to be "0" and a signal having a low logic state at the intermediate part of a constant period is considered to be "1", as shown in FIG. 6. The signal based on Manchester coding is based on a coding scheme in which a digital value based on Miller coding is modulated to a subcarrier type, as shown in FIG. 6.

The waveform shaping unit 223-2 performs waveform shaping such that the analog signal LA-LB output to the security module 230 is greater than the analog signal LAA-LBB output to the signal conversion unit 223-1 between the signal conversion unit 223-1 and the security module 230.

Figure 7:
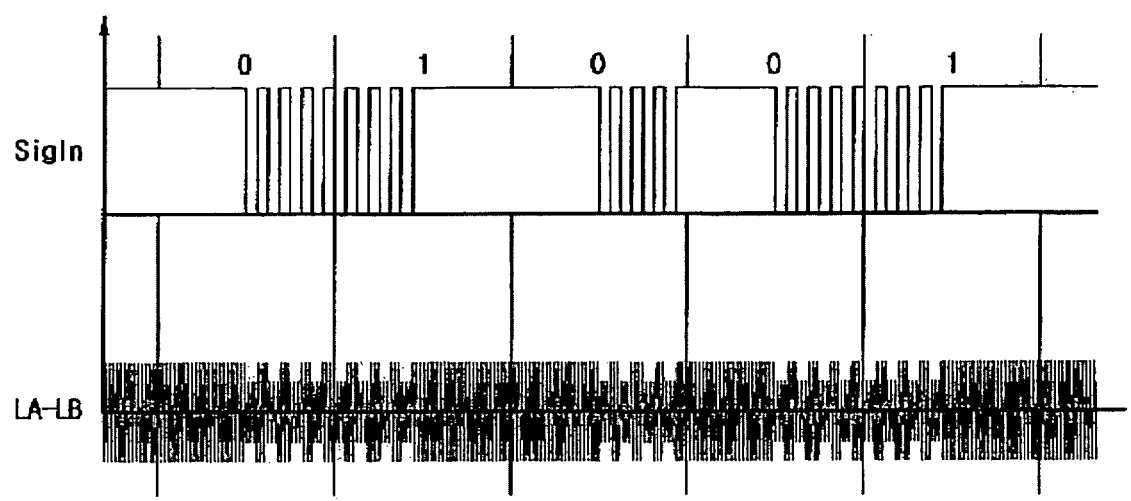
FIG. 7 is a waveform diagram of a process in which a signal based on the ISO protocol received from the security module is converted into a signal based on the S2C protocol and is then output to the NFC unit.

In a similar way, the analog signal LA-LB output from the security module 230 is a digital signal, which is modulated and coded using Manchester coding, as shown in the lower view of FIG. 7. The analog signal LA-LB is waveform-shaped into the signal LAA-LBB by the waveform shaping unit 223-2, and is then converted into the signal SigIn based on the S2C protocol by the signal conversion unit 223-1.

In FIG. 5, the waveform shaping unit 223-2 includes a first resistor R1, a second resistor R2, a first diode D1, a second diode D2, a first capacitor C1, a second capacitor C2, a third capacitor C3, a fourth capacitor C4, and an inductor L1. The circuit of FIG. 5 showing the waveform shaping unit 223-2 is only an example, therefore one of various circuits for waveform shaping may be used. The first resistor R1 is connected between a first terminal LS and a second terminal LAA, which are connected to the signal conversion unit 223-1. The first capacitor C1 is connected between the second terminal LAA, which is connected to the signal conversion unit 223-1, and a first node ND1. The second resistor R2 is connected between the first node ND1 and a ground GND. The second capacitor C2 is connected between the first node ND1 and the ground GND. The first diode D1 is connected between the first node ND1 and a second node ND2. The second diode D2 is connected between the second node ND2 and the ground GND. The third capacitor C3 is connected between a first terminal LA and a second terminal LB, which are connected to the security module 230. The fourth capacitor C4 is connected between the first terminal LA, which is connected to the security module 230, and the second node ND2. The inductor L1 is connected between a third terminal LBB, which is connected to the signal conversion unit 223-1, and the first terminal LA, which is connected to the security module 230.

In the case where the protocol converted signals are input to and output from the security module 230, the signal conversion unit 223-1 turns on a switch SW, so the ground GND is applied to the second terminal LB, which is connected to the security module 230, to operate the waveform shaping unit 223-2.

Accordingly, the signals LA-LB via the terminals connected to the security module 230 are decreased in size by the waveform shaping unit 223-2 and then output to the signal conversion unit 223-1, and the signals LAA-LBB from the signal conversion unit 223-1 are increased in size by the waveform shaping unit 223-2 and then output to the security module 230, through the general operation of the first diode D1 and second diode D2 of the waveform shaping unit 223-2 and the R-C filter (R2, C2) circuit operation of the waveform shaping unit 223-2. For example, the signals LAA-LBB output to the signal conversion unit 223-1 may have a peak-to-peak level of about 3 V and the signals LA-LB output to the security module 230 may have a peak-to-peak level of about 12 to 13 V.

The operation of the protocol matching unit 220 is described in more detail below with reference to the flowchart of FIG. 8.

Figure 8:
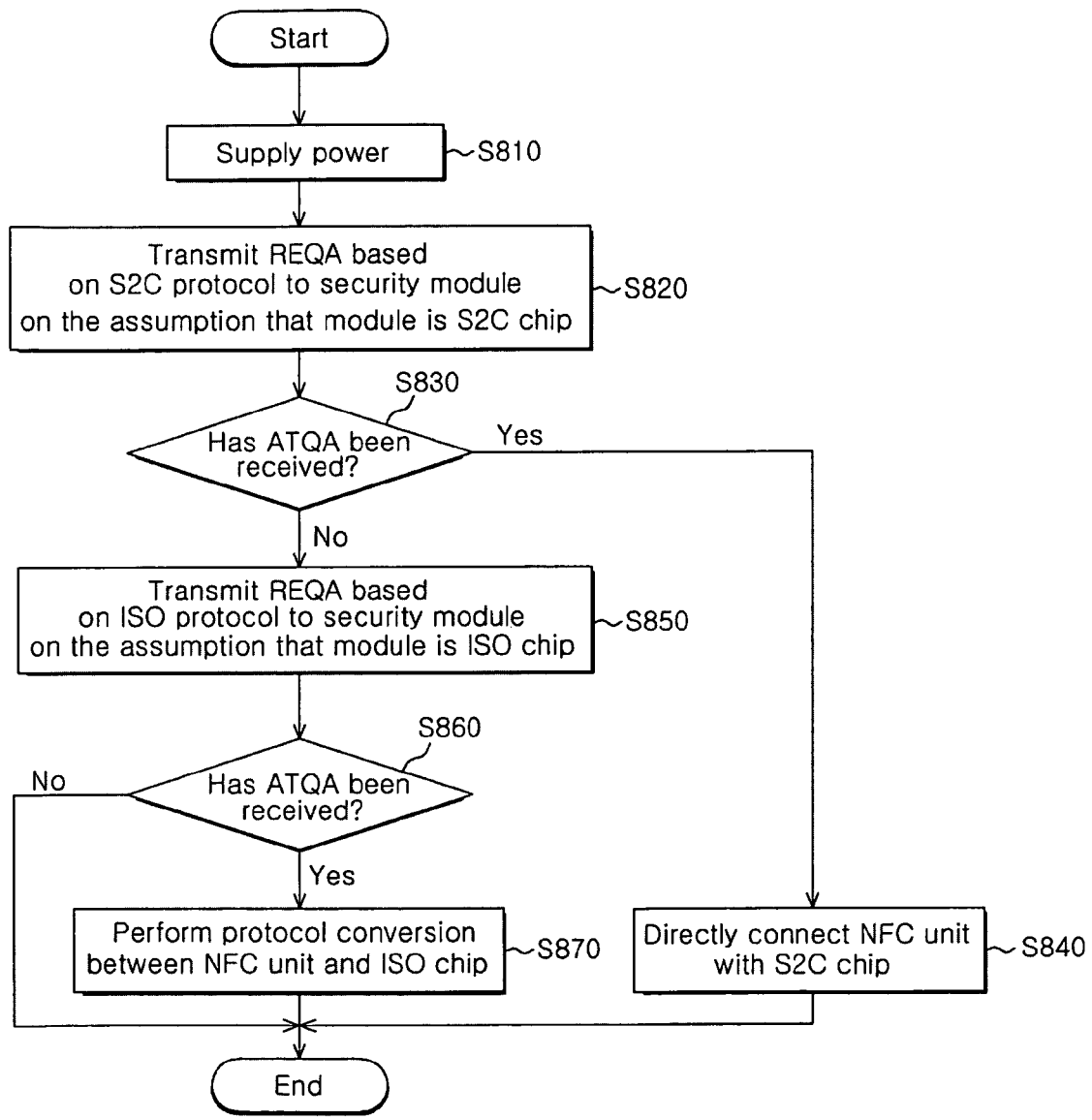
FIG. 8 is a flowchart showing the operation of the protocol matching unit of FIG. 2.

When power is supplied to the protocol matching unit 220, a voltage is transferred to the security module 230 and the security module 230 enters an operating state at step S810 of FIG. 8. In this initial state, the chip identification unit 222 first assumes that the security module 230 has a chip based on the S2C protocol and then transmits a request signal (REQA: Request A) (for example, 0x26 in the hexadecimal system) based on the S2C protocol to the SigOut (or the terminal LA) terminal of the security module 230 at step S820 of FIG. 8. The chip identification unit 222 then determines whether a response signal (ATQA: Answer to Request A) (for example, 0403 in the hexadecimal system) based on the S2C protocol has been received from the SigIn terminal (or the terminal LB) of the security module 230 within a predetermined time (for example, 5 msec) at step S830 of FIG. 8. If the response signal ATQA has been received, the chip identification unit 222 generates a chip identification signal CIS indicating that the security module 230 is a module having a chip based on the S2C protocol. The chip identification signal CIS may be output in a low logic state. If the chip identification signal CIS is output in a low logic state, the selection unit 221 directly connects the NFC unit 210 with the chip based on the S2C protocol, which is inserted as the security module 230, and bypasses the signals SigIn and SigOut based on the S2C protocol, which are input to and output from the NFC unit 210, to the security module 230 at step S840 of FIG. 8.

In contrast, if the response signal ATQA based on the S2C protocol has not been received at step S830, the chip identification unit 222 assumes that the security module 230 has a chip based on the ISO protocol and transmits a request signal REQA (for example, 0x26 in a hexadecimal system) based on the ISO protocol to the LA-LB terminals (or the SigIn and SigOut terminals) of the security module 230 at step S850 of FIG. 8. The chip identification unit 222 then determines whether the response signal ATQA (for example, 0403 in a hexadecimal system) based on the ISO protocol has been received from the LA-LB terminals (or the SigIn and SigOut terminals) of the security module 230 within a predetermined time (for example, 5 msec) after the request signal REQA has been transmitted at step S860 of FIG. 8. If the response signal ATQA has been received, the chip identification unit 222 generates a chip identification signal CIS indicating that the security module 230 is a module having a chip based on the ISO protocol. The chip identification signal CIS may be output in a high logic state. In the case where the chip identification signal CIS is output in a high logic state, the selection unit 221 outputs the signals SigIn and SigOut based on the S2C protocol to the protocol conversion unit 223 to perform protocol conversion that allows the signals SigIn and SigOut based on the S2C protocol, which are input to and output from the NFC unit 210, to be compatible with the signal LA-LB based on the ISO protocol, which is input to and output from the security module 230, thereby allowing communication between the NFC unit 210 and the chip based on the ISO protocol, which is inserted as the security module 230. Accordingly, the protocol conversion unit 223 performs protocol conversion so that the signals SigIn and SigOut based on the S2C protocol for the protocol conversion are compatible with the signal LA-LB input to and output from the security module 230 at step S870 of FIG. 8.

As described above, the chip identification unit 222 first determines whether the security module 230 is a module having a chip based on the S2C protocol. The reason for this is that the chip identification unit 222 has a digital peak-to-peak level of 3 to 5 V based on the Miller coding when it transmits the request signal REQA based on the S2C protocol and receives the response signal ATQA through the terminals SigIn and SigOut (or the terminals LA and LB) of the security module 230, but has an analog peak-to-peak level of 12 to 13 V based on the Manchester coding when it transmits the request signal REQA based on the ISO protocol to the security module 230 and receives the response signal ATQA. As described above, damage to circuits due to the application of a high voltage to the security module 230 can be prevented in such a way as to determine whether the security module 230 operates at a low voltage (that is, it operates in accordance with the S2C protocol).

Meanwhile, the secure NFC apparatus 200 according to an embodiment of the present invention, which is shown in FIG. 2, may be mounted in a mobile communication terminal and communicate with a reader, as shown in FIG. 9.

For example, a user who desires to pass through a security gate can transmit authentication information to a reader for entry authentication through the antenna 211 of the secure NFC apparatus 200 by bringing the mobile communication terminal equipped with the secure NFC apparatus 200 close to a main body (that is, the reader) mounted in the security gate for entry authentication.

That is, when information requesting authentication is received from the reader through the antenna 211 of the secure NFC apparatus 200, information based on a received signal can be transmitted to the security module 230 through the NFC unit 210 and the protocol matching unit 220. In this case, the security module 230 extracts authentication information, such as a user Identification (ID) for user identification, stored in the EEPROM 234 under the control of the CPU 231. The extracted authentication information can be transmitted to the reader through the protocol matching unit 220 and the NFC unit 210. If corresponding authentication is successful in the reader, the user can pass through the security gate.

Furthermore, in the case where a reader for transportation or payment is used, a user brings a mobile communication terminal equipped with the secure NFC apparatus 200 close to the reader, and can use transportation or pay the cost if the authentication of the amount of charged money is successful in the reader.

Furthermore, the secure NFC apparatus 200 according to an embodiment of the present invention, which is shown in FIG. 2, can be mounted in different mobile communication terminals and enable peer-to-peer communication, as shown in FIG. 10.

For example, currently many users store electronic name cards, photos, motion images, and/or telephone directories in their mobile communication terminals, and then use them. However, only when such personal information is input again or downloaded when terminals are changed can users use personal information, which was stored in previous terminals, in current terminals.

However, in the present embodiment, such personal information can be managed in the security module 230 of the secure NFC apparatus 200 mounted in the mobile communication terminal. When personal information is managed in the security module 230, it is possible to move the personal information to a peer terminal through communication between mobile communication terminals.

For example, mobile communication terminals equipped with the secure NFC apparatus 200 are brought close to each other, and one of the mobile communication terminals attempting to transmit personal information can send the personal information, along with authentication information, to the other mobile communication terminal through the antenna 211 of the secure NFC apparatus 200. When the other mobile communication terminal receives the authentication information and the personal information through the antenna 211 of the secure NFC apparatus 200, the other mobile communication terminal can transmit information based on received signals to the security module 230 through the NFC unit 210 and the protocol matching unit 220. In this case, the security module 230 can perform authentication under the control of the CPU 231, store the personal information included in the received signals in the EEPROM 234 if the authentication is successful, and manage the stored personal information.

As described above, in the secure NFC apparatus 200 according to the present invention, the protocol matching unit 220 identifies the type of the chip in the security module 230, which is inserted in a plug-in fashion, generates a chip identification signal CIS according to the results of the identification, and matches the protocol of the signals SigIn and SigOut based on the S2C protocol, which are input to and output from the NFC unit 210, with the protocol of the signals LA-LB, which are input to and output from the security module 230, according to the chip identification signal CIS.

The secure NFC method according to an embodiment of the present invention may be implemented in program instruction form that can be executed through a variety of computer means, and recorded in a computer-readable medium. The computer-readable medium may include program instructions, data files, a data structure or a combination thereof. The program instructions recorded in the computer-readable medium may be specially designed and constructed for the present invention, or be well known to those skilled in the field of computer software. Examples of the computer-readable recording medium include magnetic media such as a hard disk, a floppy disk and a magnetic tape, optical media such as Compact Disk (CD)-ROM and a Digital Versatile Disk (DVD), magneto-optical media such as a floptical disk, and hardware devices such as ROM, RAM and flash memory, that are specially designed to store and execute program instructions. The computer-readable medium may be a transmission medium, such as light including a carrier that transmits signals designating program instructions or data structures, a metallic line, or a waveguide. Examples of the program instructions include not only machine language code constructed by a compiler but also high level language code executable by a computer via an interpreter. The hardware devices may be constructed to act as one or more software modules for performing the operation of the present invention, and vice versa.

As described above, in the secure NFC apparatus according to the present invention, signals based on the S2C protocol of NFC are selectively converted into signals suitable for the protocol of another a security authentication module. Therefore, the secure NFC apparatus of the present invention can support not only a security authentication module based on the S2C protocol but also a variety of security authentication modules, such as general contact/non-contact smart cards, which are inserted into the socket in a plug-in fashion. Accordingly, the present invention is advantageous in that user authentication information managed in various security authentication modules can be used in an easily compatible fashion.

Furthermore, the present invention is advantageous in that data communication between portable terminals (that is, peers), such as mobile communication terminals, is freely performed, therefore personal information, such as electronic name cards, photos, moving images, and telephone directories, can be easily managed.

Although the specific embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secure Near Field Communication (NFC) apparatus, comprising:
   a plug-in socket for inserting a security module;
   an NFC unit outside the plug-in socket, configured to communicate with an external device via non-contact NFC based on a first communication protocol, and configured to additionally communicate with the security module inserted in the socket; and
   a protocol matching unit outside the plug-in socket and connected between the NFC unit and the socket such that signals communicated between the NFC unit and the inserted security module pass through the protocol matching unit, wherein the inserted security module is communicated with the protocol matching unit based on a second communication protocol;
   wherein said protocol matching unit is configured to
      identify a type of the security module by communicating with the security module inserted in the plug-in socket,
      generate a chip identification signal related to the type of the security module,
      identify the first communication protocol in which signals are communicated between the NFC unit and the protocol matching unit,
      identify the second communication protocol in which signals are communicated between the protocol matching unit and the inserted security module, and
      based on the chip identification signal, determine if the first communication protocol matches the second communication protocol,
   wherein the protocol matching unit comprises a protocol conversion unit configured to perform protocol conversion between the first and second communication protocols in response to a determination that the first communication protocol does not match the second communication protocol; and in response to a determination that the first communication protocol matches the second communication protocol, the protocol matching unit causes signals output by the NFC unit to bypass the protocol conversion unit and to be transferred to the inserted security module without protocol conversion, and causes signals output by the inserted security module to bypass the protocol conversion unit and to be transferred to the NFC unit without protocol conversion.

2. The secure NFC apparatus as set forth in claim 1, wherein the protocol matching unit is configured to identify the type of chip of the security module as either a chip based on an International Standards Organization (ISO) protocol or a chip based on the first communication protocol.

3. The secure NFC apparatus as set forth in claim 2, wherein
the socket is configured to receive, in a plugged-in manner, a non-contact smart card as the security module; and
the protocol matching unit is configured to identify the type of chip of the non-contact smart card as a chip based on the ISO protocol.

4. The secure NFC apparatus as set forth in claim 1, wherein the plug-in socket is a socket corresponding to chip specifications of a contact smart card.

5. The secure NFC apparatus as set forth in claim 1, wherein the protocol matching unit comprises a chip identification unit configured to transmit a request signal to the security module and configured to generate the chip identification signal according to a signal received in response to the request signal.

6. The secure NFC apparatus as set forth in claim 5, wherein the chip identification unit is configured to first determine whether the security module is a module having a chip based on the first communication protocol, and then determine whether the security module is a module having a chip based on an ISO protocol if the security module is not a module having a chip based on the first communication protocol.

7. The secure NFC apparatus as set forth in claim 6, wherein the chip identification unit is configured to
transmit a request signal based on the first communication protocol to the security module, and
generate the chip identification signal indicating that the security module is a module having a chip based on the first communication protocol, if a response signal based on the first communication protocol is received within a predetermined time period after the request signal based on the first communication protocol has been transmitted to the security module.

8. The secure NFC apparatus as set forth in claim 7, wherein, if no response signal based on the first communication protocol is received, the chip identification unit is configured to
transmit a further request signal based on the ISO communication protocol to the security module, and
generate the chip identification signal indicating that the security module is a module having a chip based on the ISO protocol, if a response signal based on the ISO protocol is received within a predetermined time period after the further request signal based on the ISO protocol has been transmitted to the security module.

9. The secure NFC apparatus as set forth in claim 5, wherein the protocol matching unit further comprises:
a selection unit connected between the NFC unit and the protocol conversion unit and configured to, depending on the chip identification signal, selectively bypass the signals based on the first communication protocol, which are input to and output from the NFC unit, to the security module, or output the signals based on the first communication protocol to the protocol conversion unit for protocol conversion, and
wherein the protocol conversion unit is configured to perform protocol conversion between the signals based on the first communication protocol which are output from the selection unit, and the signals which are input to and output from the security module, so that the signals are compatible with each other.

10. The secure NFC apparatus as set forth in claim 9, wherein the protocol conversion unit comprises:
a signal conversion unit configured to perform protocol conversion between Miller coded signals based on the first communication protocol and Manchester coded signals based on an ISO protocol so that the signals are compatible with each other; and
a waveform shaping unit connected between the signal conversion unit and the socket and configured to perform waveform shaping on analog signals communicated between the signal conversion unit and the socket so that a size of the analog signals output to the security module inserted in the socket is greater than a size of the analog signals output to the signal conversion unit.

11. The secure NFC apparatus as set forth in claim 10, wherein the waveform shaping unit comprises:
a first resistor connected between a first terminal and a second terminal of the signal conversion unit;
a first capacitor connected between the second terminal of the signal conversion unit, and a first node;
a second resistor connected between the first node and a ground;
a second capacitor connected between the first node and the ground;
a first diode connected between the first node and a second node;
a second diode connected between the second node and the ground;
a third capacitor connected between the first terminal and the second terminal of the socket;
a fourth capacitor connected between the first terminal of the socket and the second node; and
an inductor connected between a third terminal of the signal conversion unit, and the first terminal of the socket.

12. The secure NFC apparatus as set forth in claim 11, wherein the signal conversion unit is configured to ground the second terminal of the socket when the signals which have been converted are input to and output from the security module.

13. The secure NFC apparatus as set forth in claim 1, wherein the first communication protocol is a SigIn-SigOut-Connection (S2C) protocol.

14. A secure Near Field Communication (NFC) method using a security module plugged in a socket of a secure NFC apparatus, the method comprising:
communicating an external device with a NFC unit of the secure NFC apparatus via non-contact NFC based on a first communication protocol, the NFC unit being outside the socket and configured to additionally communicate with the security module through a protocol matching unit of the secure NFC apparatus, said protocol matching unit being outside the socket and connected between the security module and the NFC unit, wherein the inserted security module is communicated with the protocol matching unit based on a second communication protocol;

the protocol matching unit identifying a type of the security module by communicating with the security module inserted in the socket and generating a chip identification signal related to the type of the security module;

the protocol matching unit identifying the first communication protocol in which signals are communicated between the NFC unit and the protocol matching unit;

the protocol matching unit identifying the second communication protocol in which signals are communicated between the protocol matching unit and the inserted security module;

based on the chip identification signal, the protocol matching unit determining if the first communication protocol matches the second communication protocol;

the protocol matching unit performing conversion, by means of a protocol conversion unit included in the protocol matching unit, between the first communication protocol and the second communication protocol in response to a determination that the first communication protocol does not match the second communication protocol; and the protocol matching unit causing the signals communicated between the NFC unit and the security module to bypass the protocol conversion unit in response to a determination that the first communication protocol matches the second communication protocol.

15. The secure NFC method as set forth in claim 14, wherein the security module outputs a user Identification (ID) for identification of a user or an amount of charged money for use of a service as authentication information in response to an input signal.

16. The secure NFC method as set forth in claim 14, wherein the security module performs authentication in response to an input signal, and stores personal information included in the input signal if the authentication is successful.

17. The secure NFC method as set forth in claim 16, wherein:

the secure NFC apparatus is mounted in a mobile communication terminal; and the input signal received by the security module is a signal generated from information that is received via the non-contact NFC with another mobile communication terminal equipped with another secure NFC apparatus.

18. The secure NFC method as set forth in claim 17, wherein the personal information is an electronic name card, a photo, a moving image or a telephone directory, which is managed in a further security module in the another secure NFC apparatus of said another mobile communication terminal.

19. The secure NFC method as set forth in claim 14, wherein the security module is a module having either a chip based on an ISO (International Organization for Standardization) protocol or a chip based on the first communication protocol.

20. The secure NFC method as set forth in claim 19, wherein the security module is a non-contact smart card and the chip of the non-contact smart card is based on the ISO protocol.

21. The secure NFC method as set forth in claim 14, wherein the socket corresponds to chip specifications of a contact smart card.

22. The secure NFC method as set forth in claim 14, wherein the external device comprises a reader for authentication.

23. The secure NFC method as set forth in claim 14, further comprising:

including the external device and the secure NFC apparatus in mobile communication terminals, wherein the non-contact NFC is performed between the mobile communication terminals to manage personal information.

24. The secure NFC method as set forth in claim 14, further comprising:

determining whether the security module is a module having a chip based on the first communication protocol;

causing the signals based on the first communication protocol and communicated between the NFC unit and the security module to bypass the protocol conversion unit if the security module is a module having a chip based on the first communication protocol;

determining whether the security module is a module having a chip based on an ISO protocol; and performing protocol conversion between the signals based on the first communication protocol and the signals input to and output from the security module if the security module is a module having a chip based on the ISO protocol.

25. The secure NFC method as set forth in claim 24, further comprising determining that the security module is a module having a chip based on the first communication protocol if a response signal according to the first communication protocol is received within a predetermined time period after a request signal based on the first communication protocol has been transmitted to the security module.

26. The secure NFC method as set forth in claim 25, further comprising, if no response signal based on the first communication protocol has been received, determining that the security module is a module having a chip based on the ISO protocol if a response signal based on the ISO protocol has been received within a predetermined time period after a further request signal based on the ISO protocol has been transmitted to the security module.

* * * * *